G. W. Putnam,
Spice Box,
Nº 70,613. Patented Nov. 5, 1867.
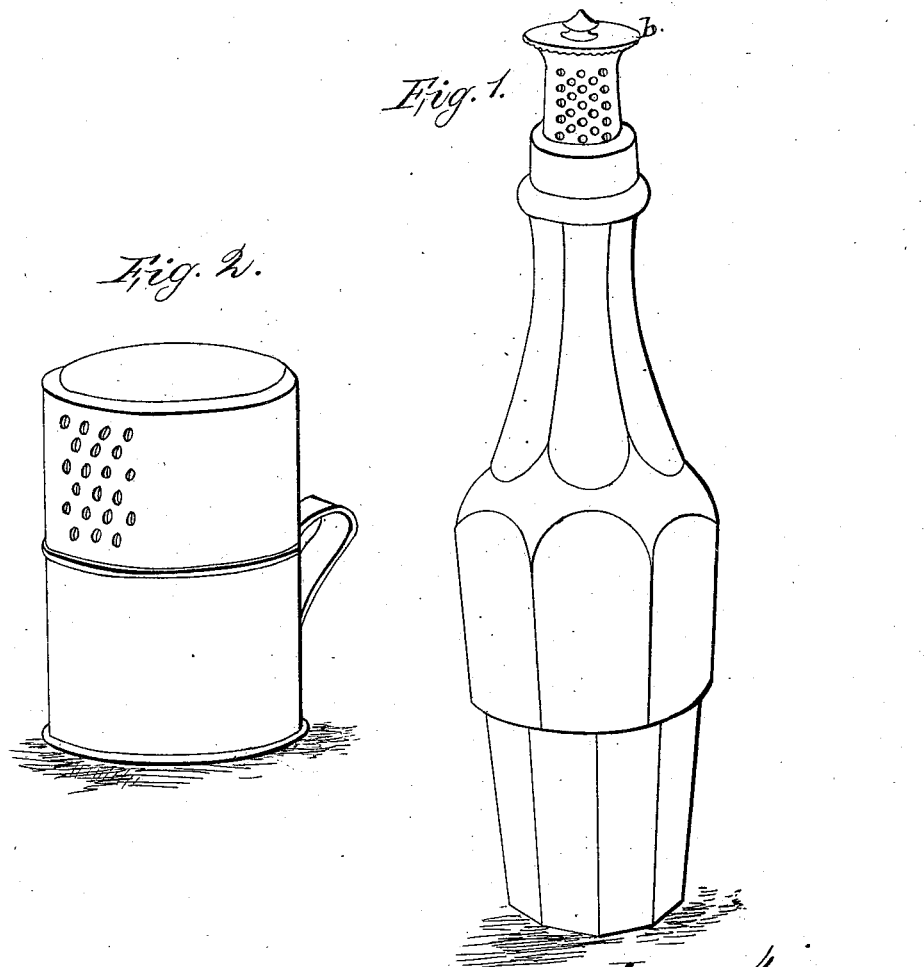
Witnesses.
Alex F. Roberts
Theo Fusche
Inventor.
G. W. Putnam
per Munn & Co
Attorneys

United States Patent Office.

GEORGE W. PUTNAM, OF PETERBORO, NEW YORK.

Letters Patent No. 70,613, dated November 5, 1867.

---

IMPROVED DREDGING, SPICE, AND PEPPER-BOX.

---

*The Schedule referred to in these Letters Patent and making part of the same.*

---

TO ALL WHOM IT MAY CONCERN:

Be it known that I, GEORGE W. PUTNAM, of Peterboro, in the county of Madison, and State of New York, have invented a new and improved Dredging and Spice-Box; and I do hereby declare that the following is a full, clear, and exact description thereof, which will enable others skilled in the art to make and use the same, reference being had to the accompanying drawings, forming a part of this specification.

The object of this invention is to facilitate the discharge or sprinkling of spice, salt, pepper, flour, or any condiments or other powdered articles of whatsoever nature, and consists simply of lateral perforations in one side only of the covering of the vessel containing the powdered material to be sprinkled, whereby the act of sprinkling or discharging the material from said vessel is easily and conveniently performed by holding the vessel down upon its side, as will be hereinafter set forth.

Figure 1 is a side elevation of the vessel, showing the perforations or holes.

Figure 2 is an ordinary dredging-box, the same in principle as fig. 1.

Similar letters of reference indicate corresponding parts.

In the drawing, the location of the holes for sprinkling the material contained in the vessels are shown at figs. 1 and 2, and are located laterally near the end of the vessel.

In using a vessel provided with perforations in one side only of its cap, the materials within the vessel may be discharged or sprinkled without completely, or nearly, inverting the same, as is necessary with the perforations as usually placed, and this act of inversion, which the common arrangement of the perforations necessitates, is attended with more or less clogging of the material to be sprinkled in and above the holes intended for its discharge. This choking up of said holes is mainly, if not wholly, due to the packing of the material lying immediately at and about the perforations, which packing is caused by the weight of the superincumbent material in the vessel, which is thus thrown more or less vertically upon the perforations when located, as heretofore, at the end of the cap. In my invention this disadvantage is obviated, as the vessel is not made to discharge its contents by holding it perfectly or nearly vertical, but simply upon its side, or at a slight depression of the perforated end from the horizontal, in which position the contents, exclusive of that portion issuing out through the perforations, rest upon the side of the vessel, and their weight does not come upon the perforations, whereby that portion lying at or near the perforations passes through freely and without choking. Furthermore, the unperforated sides of the cap serve as walls to guide the material to the perforations, thus facilitating and controlling the discharge.

It is not requisite that the side or surface containing the perforations be a strictly cylindrical surface, but in practice they may be grouped on the side of any cap or covering, or on the body of the vessel near its end, when such side or end is approximately continuous with the remaining portion of the vessel, and of such an angle with its general axis as to enable the materials to be discharged in the manner as above mentioned.

The general advantages of this improvement have been thus shown, and it has an additional desirable feature in the fact that the material to be sprinkled can be controlled and deposited in the particular place desired, instead of being scattered about, as in those vessels heretofore known or used.

Having thus described my invention, what I claim as new, and desire to secure by Letters Patent, is—

A dredging or spice-box, perforated upon its sides, substantially as herein shown and described.

GEORGE W. PUTNAM.

Witnesses:
    WM. F. McNAMARA,
    ALEX. F. ROBERTS.